United States Patent Office 3,040,056
Patented June 19, 1962

3,040,056
4-AMIDO-1,1,2-TRICYANO-1,3-BUTADIENES AND THEIR PREPARATION
John K. Williams, Wilmington, Del., assignor to E. I. du Pont de Nemours and Company, Wilmington, Del., a corporation of Delaware
No Drawing. Filed Apr. 25, 1960, Ser. No. 24,269
20 Claims. (Cl. 260—326.5)

The present invention is concerned with a new class of colored organic chemical compounds useful as dyes, and more particularly with selected 4-substituted-1,1,2-tricyano-1,3-butadienes and to a process for their preparation.

With the continued discovery of new synthetic fibers and the expanding use of these materials in clothing fabrics where colors and designs are of prime importance, there is an ever increasing need for new dyes with new chromophoric structures and having chemical characteristics which adapt them to new uses.

It is an object of this invention to provide a new class of colored organic chemical compounds useful as dyes. Another object is to provide selected 4-substituted-1,1,2-tricyano-1,3-butadienes and a novel process for their preparation. Other objects will appear hereinafter.

These and other objects of this invention are accomplished by providing the new class of 4-amido-1,1,2-tricyano-1,3-butadienes having the formula

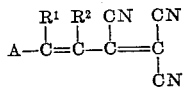

where $R^1$ and $R^2$ are hydrogen or hydrocarbyl groups free of aliphatic carbon-to-carbon unsaturation, and A is an amido group having the formula

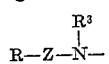

where Z is a carbonyl,

group or a sulfonyl,

group, $R^3$ is a hydrocarbyl group free of aliphatic carbon-to-carbon unsaturation, and when Z is a sulfonyl group, R is a hydrocarbyl group free of aliphatic carbon-to-carbon unsaturation, and when Z is a carbonyl group R is hydrogen or a hydrocarbyl group free of aliphatic carbon-to-carbon saturation or when taken together with $R^3$ is a trimethylene group. Thus, when Z is a carbonyl group and R taken together with $R^3$ is a trimethylene group, A is the pyrrolidonyl group having the formula

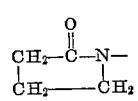

The 4-amido-1,1,2-tricyano-1,3-butadienes of this invention can be prepared by a process in which the ring of the corresponding 1,1,2,2-tetracyanocyclobutane is opened. In this novel process a 3-amido-1,1,2,2-tetracyanocyclobutane is heated in the presence of an alcohol, preferably an alkanol and more preferably a lower alkanol, such as methanol or ethanol. Temperatures in the range of 25 to 200° C. and above may be employed and temperatures in the range of 50–100° C. are preferred. It is convenient, though not essential, to employ an excess of the alcohol as a reaction medium.

This process can be illustrated generically by the following equation:

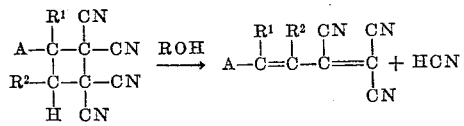

in which A and the R's are as previously defined.

When $R^1$ and $R^2$ are hydrogen, the process can be illustrated by the following equation:

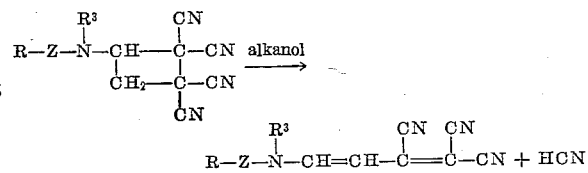

where Z, and the R's are as previously defined.

The 3-amido-1,1,2,2-tetracyanocyclobutanes are prepared by condensation of tetracyanoethylene with the corresponding amido ethylenes as illustrated in Part A of the examples. The reaction of tetracyanoethylene with an amidoethylene will occur simply on intimate contact of the reactants at room temperature. No additives or special conditions are needed. It is convenient, though not essential, to employ a diluent which is inert to the reactants and products to aid in dissipating the heat of reaction. Pressure and the proportions of reactants are not critical and may be varied widely.

The hydrocarbyl groups represented by R, $R^1$, $R^2$, and $R^3$ in the starting materials and products indicated above can be any radical composed solely of carbon and hydrogen and being free of aliphatic carbon-to-carbon unsaturation. "Hydrocarbyl" is used in its full generic sense. The term "hydrocarbyl" is consistent with chemical nomenclature and is synonymous with the term "hydrocarbon radical." The wide variation in the hydrocarbyl groups used in the illustrations which follow makes it evident that all hydrocarbyl groups free of aliphatic unsaturation are operable. Hydrocarbyl groups free of aliphatic carbon-to-carbon unsaturation include alkyl, cycloalkyl, aryl, aralkyl, alkaryl, single ring, multi ring, straight chain, branched chain, large, small, and the like. All aliphatically saturated hydrocarbyl radicals pass through the process of this invention and appear unchanged in the product. The widest variation in these hydrocarbyl radicals free from aliphatic carbon-to-carbon unsaturation does not prevent the formation of the products of this process.

The limitations of space for disclosure are not to be construed as any limitation of the scope of "hydrocarbyl" contemplated in this invention. Even the most cumbersome saturated hydrocarbyl radicals such as those obtained by removing end groups from high molecular weight hydrocarbon polymer molecules containing thousands of carbon atoms, such as polyethylene, polyisobutylene, polystyrene, and the like, are fully operable.

It is obvious that aliphatically saturated hydrocarbyl groups containing 20 or fewer carbon atoms are most available, and to that extent preferred. But there is to be no question of the operability of, or of the intent to include and disclose, any hydrocarbyl group whatsoever, as long as it is free of aliphatic carbon-to-carbon unsaturation. Wide variations in size and structure of these hydrocarbyl radicals do not affect the ability of the butadienes to which they are attached to be used as dyes.

In the following examples parts are by weight except where otherwise indicated. The examples represent a preferred embodiment of the invention.

EXAMPLE I

Part A

A solution of 250 parts of tetracyanoethylene in 888 parts of tetrahydrofuran is cooled at 0° C. and 250 parts of 1-vinyl-2-pyrrolidone is added. Within ten minutes the original deep red-orange solution fades to yellow-green in color, and a solid precipitates. The mixture is diluted with about 990 parts of petroleum ether, and the precipitate is collected by filtration and washed with ether. The pale yellow product is dried under a reduced pressure of nitrogen at 30° C. for 20 minutes. This yields 430 parts (90% yield) of dark yellow N-(2,2,3,3-tetracyanocyclobutyl)-2-pyrrolidone melting with decomposition at 110–125° C. One hundred parts of the crude product is dissolved in 391 parts of acetonitrile at room temperature, and the resulting solution is diluted with 530 parts of ether. The precipitate is recrystallized from 274 parts of acetonitrile and 535 parts of ether, recrystallized again from 118 parts of acetonitrile and 357 parts of ether, and again from 78 parts of acetonitrile and 178 parts of ether to yield crystalline N-(2,2,3,3-tetracyanocyclobutyl)-2-pyrrolidone melting at 130–130.5° C.

Part B

A solution of 27 parts of N-(2,2,3,3-tetracyanocyclobutyl)-2-pyrrolidone in about 160 parts of methanol is heated at reflux for one hour. During this time a yellow solid precipitates. The reaction mixture is cooled and 19 parts of yellow solid is collected by filtration. After two recrystallizations from acetonitrile there is obtained 4-(N-pyrrolidonyl)-1,1,2-tricyano-1,3-butadiene as a yellow crystalline solid melting at 174–175° C. The ultraviolet absorption spectrum of an acetonitrile solution shows maxima at 245; 250; 265; and 298 millimicrons with respective molecular extinction coefficients of 5570; 6000; 3700; and 40,400. The infrared absorption spectrum shows bands at 4.49 microns (conjugated —CN), 6.25 and 6.50 microns (C=C), and a carbonyl stretching vibration at 5.72 microns.

*Analysis.*—Calcd. for $C_{11}H_8N_4O$: C, 62.26; H, 3.80; N, 26.40. Found: C, 62.33; H, 3.87; N, 26.79.

EXAMPLE II

Part A

To a solution of 260 parts of tetracyanoethylene in 888 parts of tetrahydrofuran is added 400 parts of N-vinyl-N-methylbenzenesulfonamide. The resulting orange-red solution warms slightly, and within two minutes the color fades to pale yellow-green and the mixture sets up into a paste. It is allowed to stand at 25° C. for one-half hour and is then diluted with about 330 parts of petroleum ether. The solid product is collected and washed with petroleum ether to yield 610 parts (94% yield) of light yellow N-methyl-N-(2,2,3,3-tetracyanocyclobutyl)benzenesulfonamide. A sample recrystallized three times from 1:4 acetonitrile:ether mixture melts at 130–145° C. with decomposition.

Part B

A mixture of 50 parts of N-methyl-N-(2,2,3,3-tetracyanocyclobutyl)benzenesulfonamide and about 200 parts of methanol is heated at reflux for 17 hours. The resulting deep blue-green solution is cooled to room temperature. The yellow-green solid which precipitates is collected by filtration, washed with methanol, and dried to yield 27 parts of crude 4-(N-methylbenzenesulfonamido)-1,1,2-tricyano-1,3-butadiene. After recrystallization from acetonitrile this product melts at 174–176° C. The ultraviolet absorption spectrum of an acetonitrile solution shows a maximum at 385 millimicrons with a molecular extinction coefficient of 38,700.

*Analysis.*—Calcd. for $C_{14}H_{10}N_4O_2S$: C, 56.37; H, 3.38; N, 18.78. Found: C, 56.46; H, 3.49; N, 18.88.

When the amido substituted ethylenes shown in the first column of the following table are used in place of 1-vinyl-2-pyrrolidone of Part A of Example I, there are obtained the 3-amido-1,1,2,2-tetracyanocyclobutanes of the second column which on ring opening with methanol as shown in Part B of Example I yield respectively the 4-amido-1,1,2-tricyano-1,3-butadienes shown in the last column.

TABLE

| Amido Substituted Ethylene | 3-Amido-1,1,2,2-tetracyanocyclobutane Intermediate | Butadiene Formed on Ring Opening with Methanol |
|---|---|---|
| N-methyl-N-vinylformamide. | 3-(N-methylformamido)-1,1,2,2,-tetracyano-cyclobutane. | 4-(N-methylformamido)-1,1,2-tricyano-1,3-butadiene. |
| N-methyl-N-vinylacetamide. | 3-(N-methylacetamido)-1,1,2,2-tetracyanocyclobutane. | 4-(N-methylacetamido)-1,1,2-tricyano-1,3-butadiene. |
| N-ethyl-N-vinylacetamide. | 3-(N-ethylacetamido)-1,1,2,2-tetracyano-cyclobutane. | 4-(N-ethylacetamido)-1,1,2-tricyano-1,3-butadiene. |
| N-cyclohexyl-N-vinylacetamide. | 3-(N-cyclohexylacetamido)-1,1,2,2-tetracyanocyclobutane. | 4-(N-cyclohexylacetamido)-1,1,2-tricyano-1,3-butadiene. |
| N-phenyl-N-vinylacetamide. | 3-(N-phenylacetamido)-1,1,2,2-tetracyano-cyclobutane. | 4-(N-phenylacetamido)-1,1,2-tricyano-1,3-butadiene. |
| N-tolyl-N-vinyl-acetamide. | 3-(N-tolylacetamido)-1,1,2,2-tetracyanocyclobutane. | 4-(N-tolylacetamido)-1,1,2-tricyano-1,3-butadiene. |
| N-methyl-N-vinylbutyramide. | 3-(N-methylbutyramido)-1,1,2,2-tetracyanocyclobutane. | 4-(N-methylbutyramido)-1,1,2-tricyano-1,3-butadiene. |
| N-methyl-N-vinylcapramide. | 3-(N-methylcapramido)-1,1,2,2,-tetracyanocyclobutane. | 4-(N-methylcapramido)-1,1,2-tricyano-1,3-butadiene. |
| N-methyl-N-styrylacetamide. | 3-(N-methylacetamido)-4-phenyl-1,1,2,2-tetracyanocyclobutane. | 4-(N-methylacetamido)-3-phenyl-1,1,2-tricyano-1,3-butadiene. |
| N-methyl-N-(1,2-diphenylvinyl)-acetamide. | 3,4-diphenyl-3-(N-methylacetamido)-1,1,2,2-tetracyanocyclobutane. | 4-(N-methylacetamido)-3,4-diphenyl-1,1,2-tricyano-1,3-butadiene. |
| N-methyl-N-styrylbenzamide. | 3-(N-methylbenzamido)-4-phenyl-1,1,2,2-tetracyanocyclobutane. | 4-(N-methylbenzamido)-3-phenyl-1,1,2-tricyano-1,3-butadiene. |
| N-methyl-N-vinylbenzamide. | 3-(N-methylbenzamido)-1,1,2,2-tetracyanocyclobutane. | 4-(N-methylbenzamido)-1,1,2-tricyano-1,3-butadiene. |
| N-methyl-N-vinyl-p-toluene-sulfonamide. | 3-(N-methyl-p-toluene-sulfonamido)-1,1,2,2-tetracyanocyclobutane. | 4-(N-methyl-p-toluene-sulfonamido)-1,1,2-tricyano-1,3-butadiene. |

All amido butadienes of this invention obtainable by variation of hydrocarbyl groups within the herein stated definitions are hereby disclosed.

The 4-amido-1,1,2-tricyano-1,3-butadienes of this invention are all colored compounds which are useful as dyes. This is illustrated with the product of Example I as follows:

EXAMPLE A

A solution of 2 parts of 4-(N-pyrrolidonyl)-1,1,2-tricyano-1,3-butadiene in a mixture of 10 parts of 6 N aqueous hydrochloric acid and 235 parts of acetonitrile is added to a solution of 2 parts of a sulfonated lignin dispersant in 2000 parts of water. The whole is made up to a total of 20,000 parts by addition of water. The resulting dye bath has a pH of 5. Cloth swatches made of cellulose acetate, nylon, silk, and wool are added and the bath is heated at 80–100° C. for 30 minutes. The cloth swatches are rinsed with water and dried. By this treatment the cellulose acetate is dyed yellow; the nylon is dyed brown; the silk is dyed beige; and the wool is dyed brown.

The products of this invention may be named without employing the amido terminology which is preferably limited to acetamido and benzamido functions. Thus 4-(N - methylbenzenesulfonamido) - 1,1,2 - tricyano-1,3-butadiene of Example II may also be named N-methyl-N-(1,1,2 - tricyano - 1,3 - butadien - 4 - yl)benzenesulfonamide. Similarly, 4-(N-methylformamido)-1,1,2-tricyano-1,3-butadiene may also be named N-methyl-N-(1,1,2-tricyano-1,3-butadien-4-yl)formamide, etc. All the 4-amido-butadiene terms are interchangeable with the corresponding N-(butadien-4-yl)amides.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A 4-amido-1,1,2-tricyano-1,3-butadiene of the formula

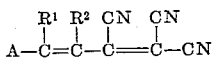

where $R^1$ and $R^2$ are selected from the group consisting of hydrogen and hydrocarbyl groups free of aliphatic carbon-to-carbon unsaturation, and A is selected from the group consisting of the pyrrolidonyl radical and amido radicals of the formula

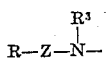

where $R^3$ is a hydrocarbyl group free of aliphatic carbon-to-carbon unsaturation, Z is selected from the group consisting of carbonyl and sulfonyl, and when Z is sulfonyl R is a hydrocarbyl group free of aliphatic carbon-to-carbon unsaturation, and when Z is carbonyl, R is selected from the group consisting of hydrogen and hydrocarbyl groups free of aliphatic carbon-to-carbon unsaturation.

2. A 4-amido-1,1,2-tricyano-1,3-butadiene of the formula

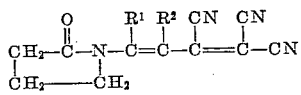

where $R^1$ and $R^2$ are hydrocarbyl groups free of aliphatic carbon-to-carbon unsaturation.

3. A 4-amido-1,1,2-tricyano-1,3-butadiene of the formula

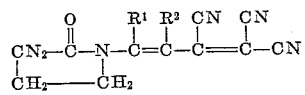

where $R^1$ is hydrogen and $R^2$ is alkyl.

4. 4-(N-pyrrolidonyl)-1,1,2-tricyano-1,3-butadiene.

5. A 4-amido-1,1,2-tricyano-1,3-butadiene of the formula

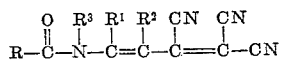

where R, $R^1$, $R^2$ and $R^3$ are hydrocarbyl groups free of aliphatic carbon-to-carbon unsaturation.

6. A 4-amido-1,1,2-tricyano-1,3-butadiene of the formula

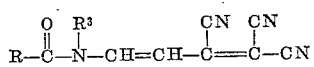

where R and $R^3$ are hydrocarbyl groups free of aliphatic carbon-to-carbon unsaturation.

7. A 4-amido-1,1,2-tricyano-1,3-butadiene of the formula

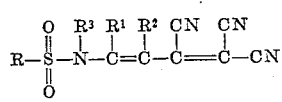

where R, $R^1$, $R^2$ and $R^3$ are hydrocarbyl groups free of aliphatic carbon-to-carbon unsaturation.

8. A 4-amido-1,1,2-tricyano-1,3-butadiene of the formula

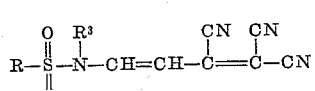

where R and $R^3$ are hydrocarbyl groups free of aliphatic carbon-to-carbon unsaturation.

9. 4-(N-methylbenzenesulfonamido)-1,1,2-tricyano-1,3-butadiene.

10. Process which comprises heating in contact with an alkanol, a 3-amido-1,1,2,2-tetracyanocyclobutane of the formula

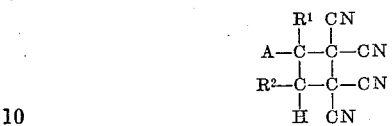

where $R^1$ and $R^2$ are selected from the group consisting of hydrogen and hydrocarbyl groups free of aliphatic carbon-to-carbon unsaturation, and A is selected from the group consisting of the pyrrolidonyl radical and amido radicals of the formula

where $R^3$ is a hydrocarbyl group free of aliphatic carbon-to-carbon unsaturation, Z is selected from the group consisting of carbonyl and sulfonyl, and when Z is sulfonyl R is a hydrocarbyl group free of aliphatic carbon-to-carbon unsaturation, and when Z is carbonyl, R is selected from the group consisting of hydrogen and hydrocarbyl groups free of aliphatic carbon-to-carbon unsaturation, and obtaining as the resulting product a 4-amido-1,1,2-tricyano-1,3-butadiene.

11. Process which comprises heating in contact with a lower alkanol, a 3-amido-1,1,2,2-tetracyanocyclobutane of the formula

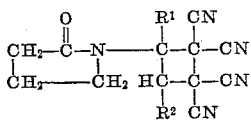

where $R^1$ and $R^2$ are hydrocarbyl groups free of aliphatic carbon-to-carbon unsaturation, and obtaining as the resulting product a 4-amido-1,1,2-tricyano-1,3-butadiene.

12. Process which comprises heating in contact with a lower alkanol, a 3-amido-1,1,2,2,-tetracyanocyclobutane of the formula

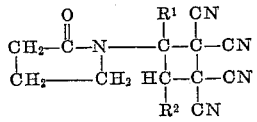

where $R^1$ is hydrogen and $R^2$ is alkyl, and obtaining as the resulting product a 4-amido-1,1,2-tricyano-1,3-butadiene.

13. Process which comprises heating in contact with a lower alkanol, N-(2,2,3,3-tetracyanocyclobutyl)-2-pyrrolidone and obtaining as the resulting product 4-(N-pyrrolidonyl)-1,1,2-tricyano-1,3-butadiene.

14. Process which comprises heating in contact with a lower alkanol, a 3-amido-1,1,2,2-tetracyanocyclobutane of the formula

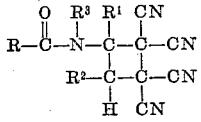

where R, $R^1$, $R^2$ and $R^3$ are hydrocarbyl groups free of aliphatic carbon-to-carbon unsaturation, and obtaining as the resulting product a 4-amido-1,1,2-tricyano-1,3-butadiene.

15. Process which comprises heating in contact with a lower alkanol, a 3-amido-1,1,2,2-tetracyanocyclobutane of the formula

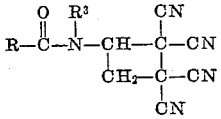

where R and R³ are hydrocarbyl groups free of aliphatic carbon-to-carbon unsaturation, and obtaining as the resulting product a 4-amido-1,1,2-tricyano-1,3-butadiene.

16. Process which comprises heating in contact with a lower alkanol, a 3-amido-1,1,2,2-tetracyanocyclobutane of the formula

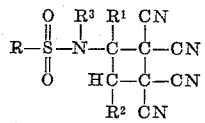

where R, R¹, R² and R³ are hydrocarbyl groups free of aliphatic carbon-to-carbon unsaturation, and obtaining as the resulting product a 4-amido-1,1,2-tricyano-1,3-butadiene.

17. Process which comprises heating in contact with a lower alkanol, a 3-amido-1,1,2,2-tetracyanocyclobutane of the formula

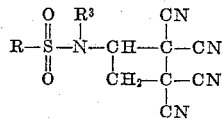

where R and R³ are hydrocarbyl groups free of aliphatic carbon-to-carbon unsaturation, and obtaining as the resulting product a 4-amido-1,1,2-tricyano-1,3-butadiene.

18. Process which comprises heating in contact with a lower alkanol, N-methyl-N-(2,2,3,3-tetracyanocyclobutyl)benzenesulfonamide and obtaining as the resulting product 4 - (N - methylbenzenesulfonamido) - 1,1,2 - tricyano-1,3-butadiene.

19. A 4-amido-1,1,2-tricyano-1,3-butadiene of the formula

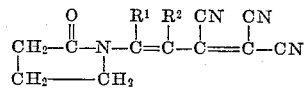

where R¹ is alkyl and R² is hydrogen.

20. Process which comprises heating in contact with a lower alkanol, a 3-amido-1,1,2,2-tetracyanocyclobutane of the formula

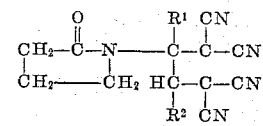

where R¹ is alkyl and R² is hydrogen, and obtaining as the resulting product a 4-amido-1,1,2-tricyano-1,3-butadiene.

No references cited.

UNITED STATES PATENT OFFICE
CERTIFICATE OF CORRECTION

Patent No. 3,040,056            June 19, 1962

John K. Williams

It is hereby certified that error appears in the above numbered patent requiring correction and that the said Letters Patent should read as corrected below.

Column 1, line 53, for "saturation" read -- unsaturation --; column 5, lines 39 to 42, the formula should appear as shown below instead of as in the patent:

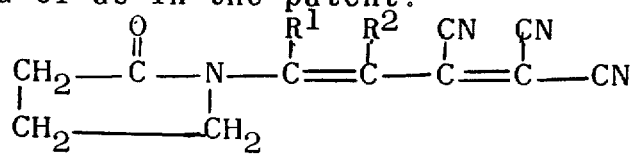

Signed and sealed this 23rd day of October 1962.

(SEAL)
Attest:

ERNEST W. SWIDER            DAVID L. LADD
Attesting Officer            Commissioner of Patents